(No Model.)
F. A. RATHBUN.
WHEELED SCRAPER.
No. 509,398.
6 Sheets—Sheet 2.
Patented Nov. 28, 1893.
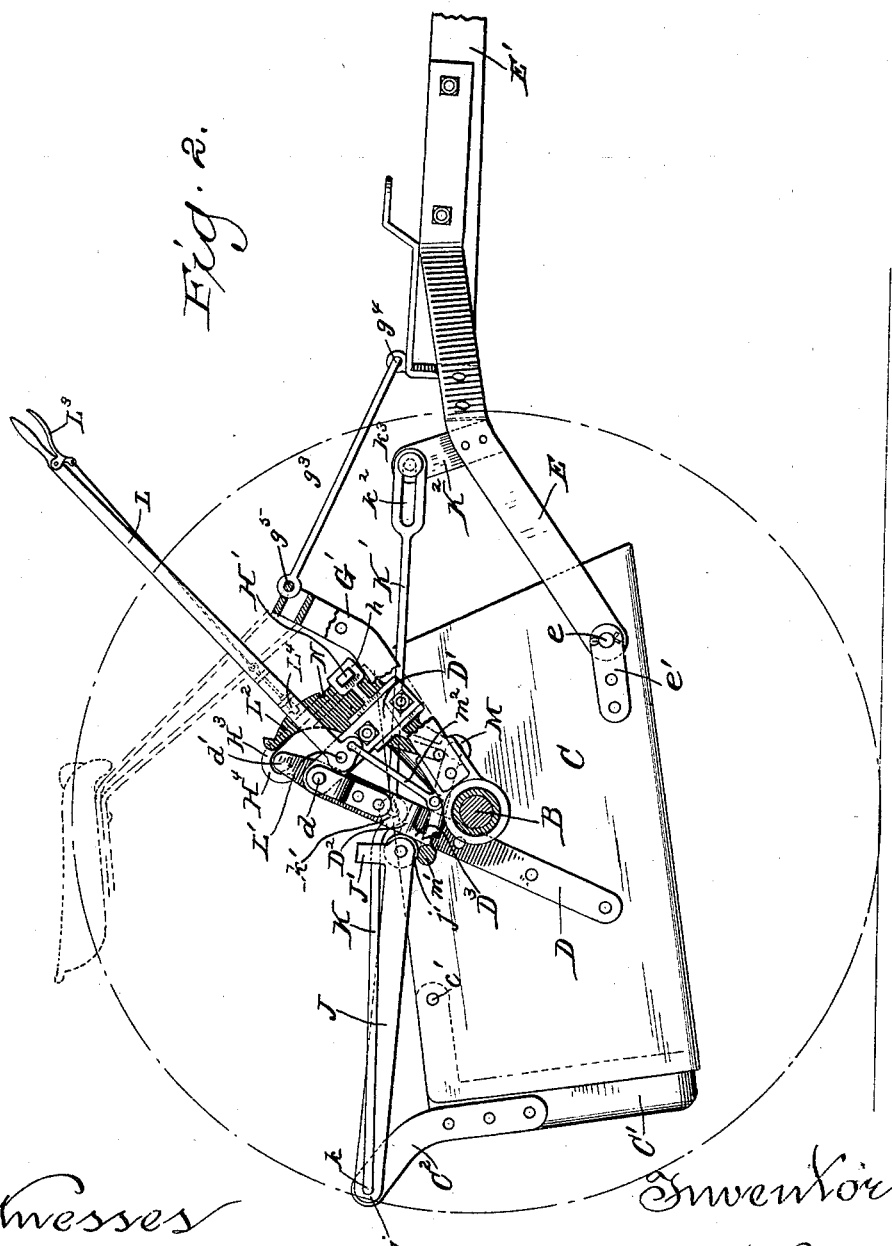
Witnesses
Geo. W. Young
John E. Wiles
Inventor
Frank A. Rathbun
By H. C. Gardiner,
Attorney

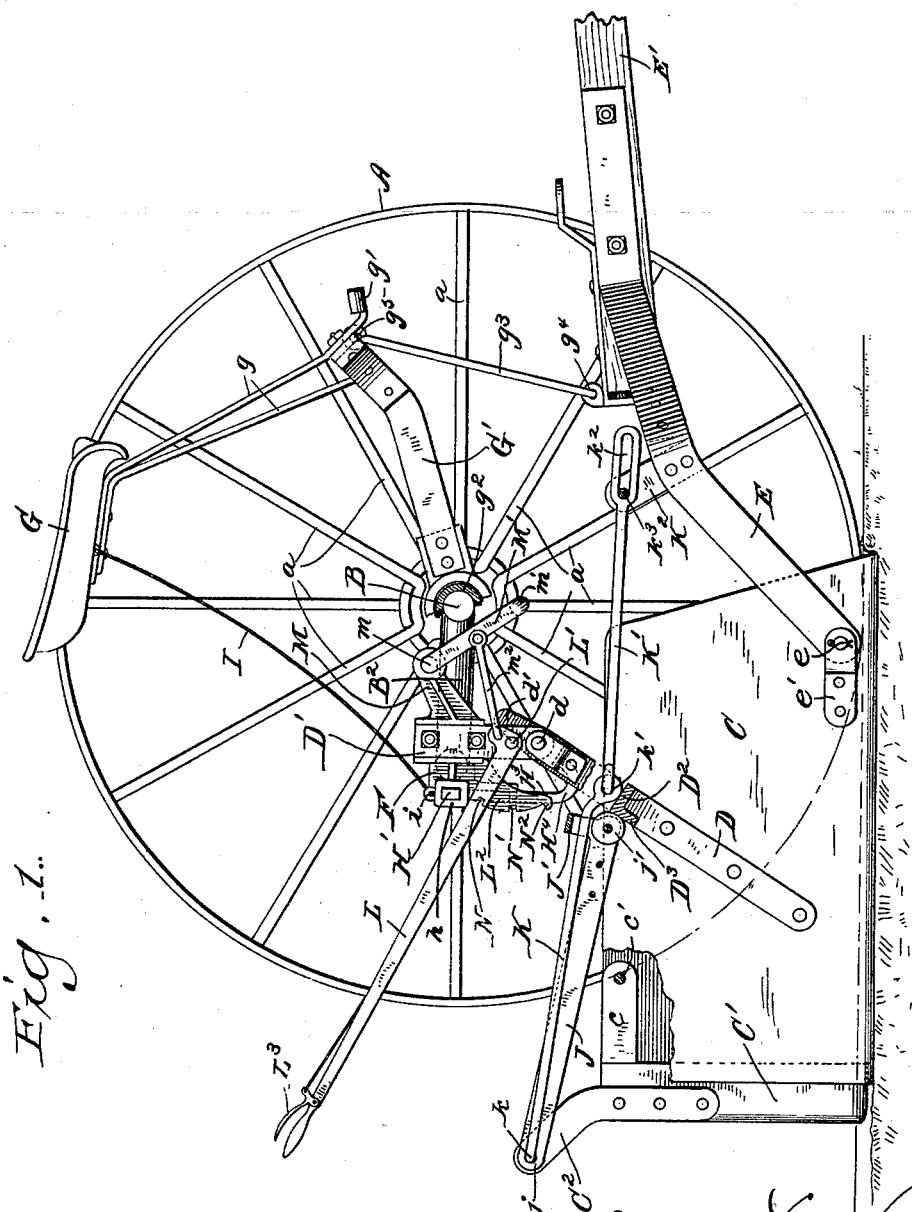

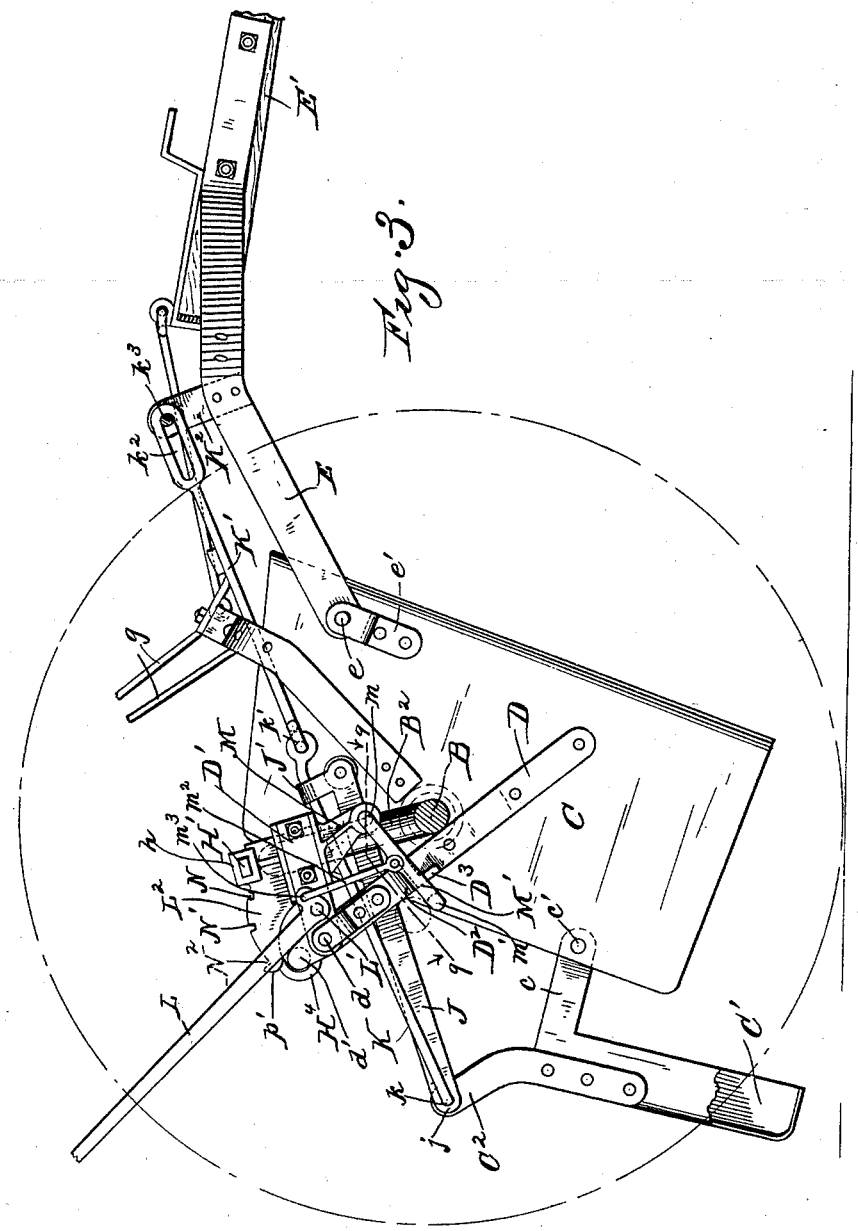

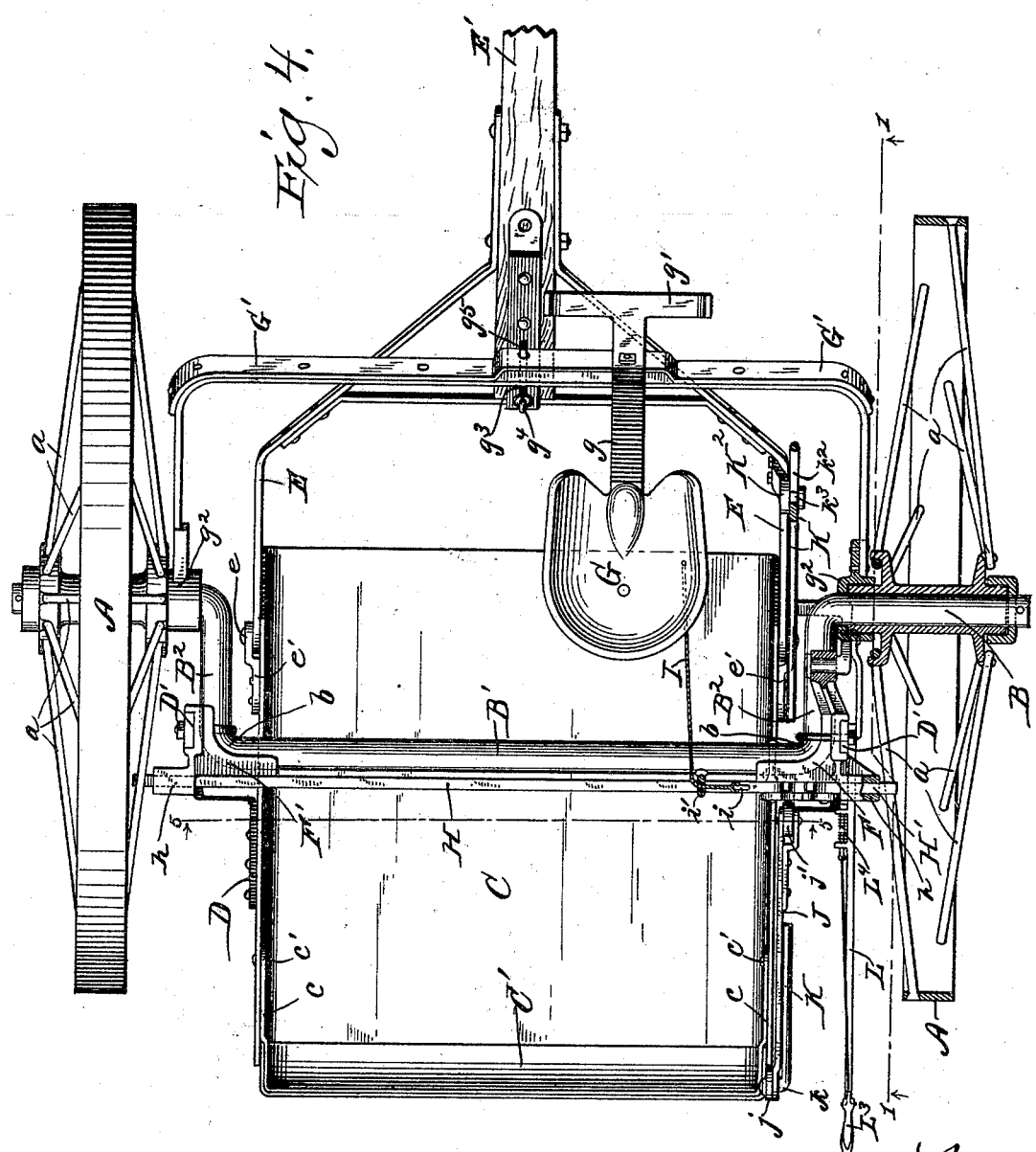

(No Model.) 6 Sheets—Sheet 5.
F. A. RATHBUN.
WHEELED SCRAPER.
No. 509,398. Patented Nov. 28, 1893.
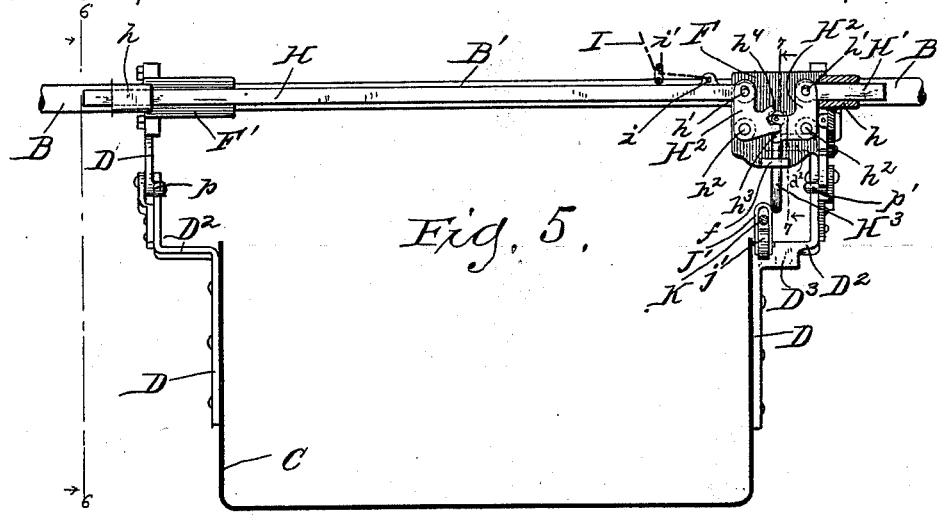
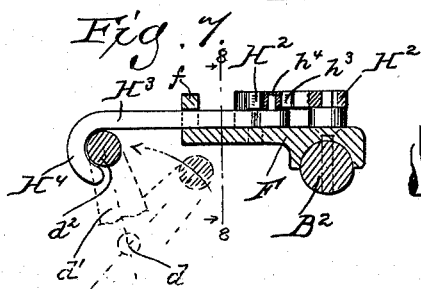
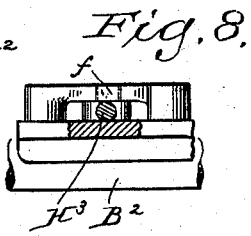
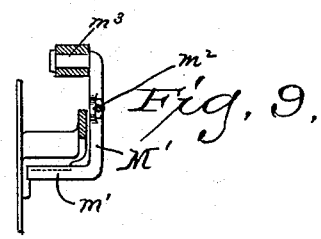
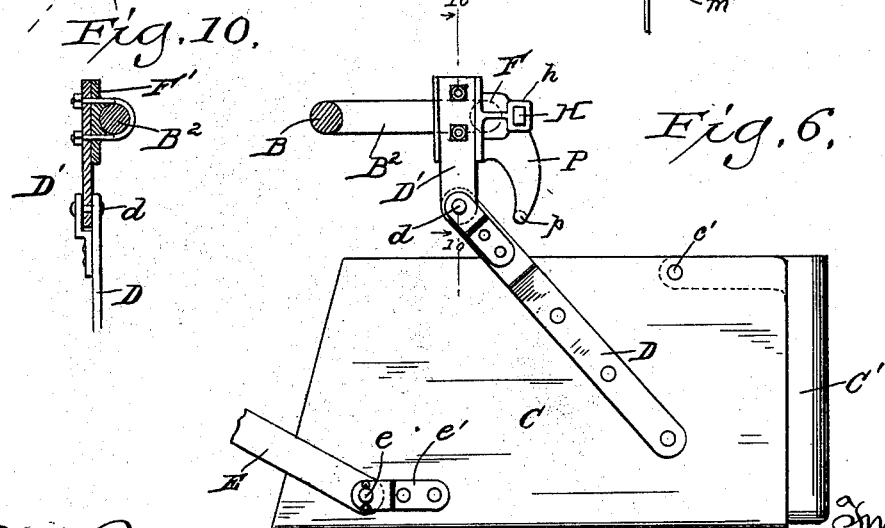
Witnesses
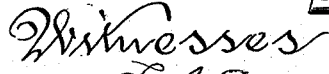
Inventor
Frank A. Rathbun
By H. C. Gardiner.
Attorney (No Model.) 6 Sheets—Sheet 6.
F. A. RATHBUN.
WHEELED SCRAPER.
No. 509,398. Patented Nov. 28, 1893.
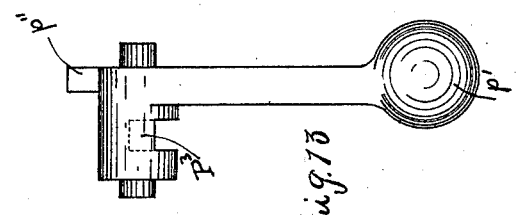
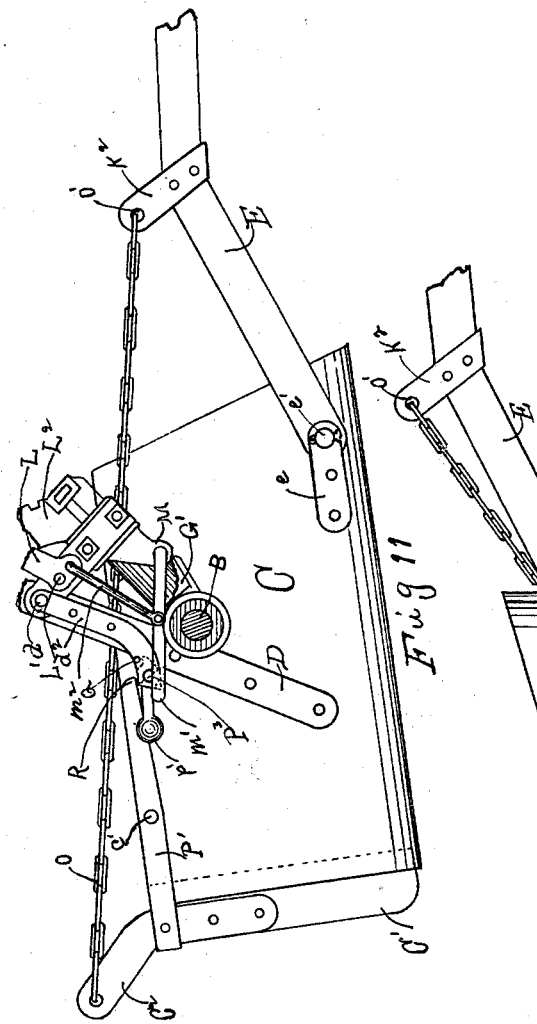
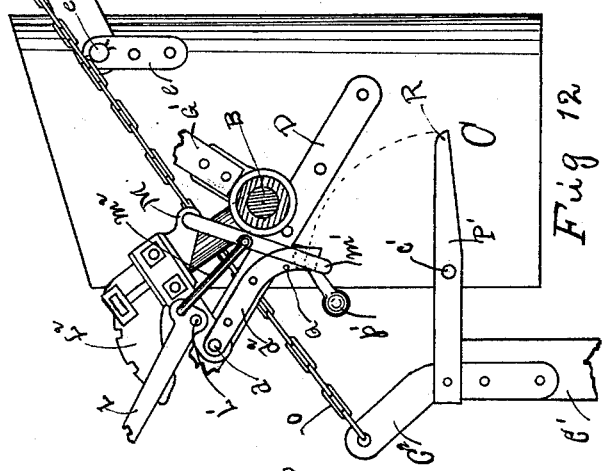

UNITED STATES PATENT OFFICE.

FRANK A. RATHBUN, OF SIOUX CITY, IOWA, ASSIGNOR TO THE RATHBUN MANUFACTURING COMPANY, OF SAME PLACE.

WHEELED SCRAPER.

SPECIFICATION forming part of Letters Patent No. 509,398, dated November 28, 1893.

Application filed August 24, 1893. Serial No. 483,978. (No model.)

*To all whom it may concern:*

Be it known that I, FRANK A. RATHBUN, a citizen of the United States, residing at Sioux City, in the county of Woodbury and State of Iowa, have invented certain new and useful Improvements in Wheeled Scrapers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in the construction of "wheeled scrapers," and consists in the matters hereinafter described and pointed out in the appended claims.

The various features of my invention will be fully described with reference to the accompanying drawings, in which—

Figure 1 is a side elevation of a wheeled scraper constructed in accordance with my invention and illustrates portions broken away on line 1--1 of Fig. 4, and shows the scraper or pan in its lowered position. Fig. 2 is a similar view of the device illustrating the scraper or pan in its raised or carrying position. Fig. 3 is still another similar view of the device and illustrates the pan in its dumping position. Fig. 4 is a top plan view of the device in the position illustrated in Fig. 1. Fig. 5 is a vertical cross section of the device taken on line 5—5 of Fig. 4. Fig. 6 is a vertical section of the same taken on line 6—6 of Fig. 5. Fig. 7 is a detail sectional view taken on line 7—7 of Fig. 5. Fig. 8 is a detail sectional view taken on line 8—8 of Fig. 7. Fig. 9 is a detail sectional view taken on line 9—9 of Fig. 3. Fig. 10 is a vertical detail sectional view taken on line 10—10 of Fig. 6. Fig. 11 is a view of scraper, or pan, in side elevation showing modified form of link connection and locking bar. Fig. 12 is a similar view and illustrates the pan in its dumped position. Fig. 13 is an enlarged detail view of rest for locking bar shown in Figs. 11 and 12.

In said drawings:—A A represent suitable carrying wheels, mounted upon a transverse axle B, the central part B', of which, is cranked, as shown.

C represents the scraper or pan, upon opposite sides of which are secured hanger bars D D which are pivotally engaged as at $d$ $d$ with angular arms D' D' clamped or otherwise rigidly secured to the angular portions $B^2$ $B^2$ of the axle. E E are the draft irons engaged at their forward ends with the tongue E' and at their rear ends engaged as at $e$ $e$ with suitable ears $e'$ $e'$ secured to the sides of the scraper or pan C, as shown in the drawings. At the angles $b$ $b$ formed in the axle B, where it is bent to form the portion B', are secured suitably shaped castings F F' with the outer surfaces of which the arms D' D' before referred to, are conveniently engaged.

C' represents the rear end wall of the pan or scraper which is conveniently provided with angular arms $c$ $c$ at its upper end which are pivotally engaged with the upper edges of the side walls of the pan, as at $c'$ $c'$, so as to permit said rear wall C' to swing into a position to uncover or open the rear end of the pan to permit the contents thereof to be discharged. Upon the upper edge of the rear wall C' and preferably upon or adjacent to one side thereof, is provided an arm $C^2$ by which said swinging rear wall may be actuated.

The seat G is supported upon suitable supports $g$ $g$, one of which is conveniently provided at its lower end with a transverse portion $g'$ which serves as a foot rest for the driver. The seat supports $g$—$g$ are secured at their lower ends to a bail G' which extends rearwardly at its opposite ends, and is revolubly engaged with the axle B adjacent to the inner ends of the hubs of the wheels A A, as shown at $g^2$ $g^2$. A link $g^3$ is flexibly secured at one end with a suitable staple or eye $g^4$ upon the rear end of the tongue, and at its other end $g^5$, has a similar engagement with the central part of the bail G'.

Transverse bars H H' are slidingly engaged with suitable bearings $h$ $h$ in the castings F F and are arranged to be extended into position to engage with the spokes $a$ $a$ of the wheels A A for a purpose to be presently described. One of these bars, as the one marked H, is conveniently arranged to extend across the space between the castings F F', the other bar H' being of considerably shorter length and arranged to extend slightly beyond the inner end of its bearing $h$. Suitable bell cranks $H^2$ $H^2$ are pivotally engaged as at $h'$ $h'$, with the adjacent ends of the bars H H, said bell cranks being also pivotally supported upon the casting F and their free ends provided with gear teeth $h^3$ $h^3$, the teeth upon each bell crank being arranged to mesh with those upon the other. It follows from this construction, that a longitudinal movement of one of said bars in one direction, will actuate its connected bell crank, and this motion will be communicated to the other bell crank and produce a longitudinal movement of the other bar in the opposite direction, so that both of said bars may be simultaneously extended or retracted.

A suitable chain, cord or other flexible device I is engaged at $i$ with the bar H and extends through a staple or guide $i'$ into a position within convenient reach of the driver, and serves as a means for simultaneously extending the bars H H' so as to bring their outer ends into engagement with the spokes of the wheels. Pivotally engaged with one of the bell cranks as at $h^4$, is a rod $H^3$ provided with a hook $H^4$ and arranged to slide longitudinally in a suitable bearing $f$, on the plate F and adapted to be operated to simultaneously retract the bars H H' so as to withdraw them from engagement with the spokes of the wheels.

An arm or bar J is pivotally engaged at one end as at $j$, with the upper end of the arm $C^2$ upon the swinging back C' of the scraper or pan C, and is provided at its free end with a roller $j'$, journaled therein. As shown more particularly in Fig. 5 of the drawings, the hanger arms D D by which the scraper or pan C is suspended from the angular arms D' D' are bent outwardly as at $D^2$ $D^2$ adjacent to their points of engagement with said arms D' D', and the hanger upon the side of the pan upon which the arm J is located, is preferably provided with a flat portion $D^3$, and said arm is so arranged that the roller $j'$ carried by its free end, will normally rest against said flat portion $D^3$. A link K is pivotally connected at $k$, with the arms $C^2$ and extends forward and has a flexible connection at $k'$, with another link K', which is provided at its forward end, with a slot $k^2$ having a movable engagement with a stud $k^3$ upon an upwardly projecting post $K^2$ upon one of the draft irons E. In Figs. 11 and 12 is shown a different kind of connection between the back of the pan and the tongue, and also another means for locking the back of the pan in its closed position. Instead of the link K a chain O is used. The back of the pan is pivoted to the right side thereof at $c'$ by means of the bar P' instead of the angular arm $c$, the forward end R', of said bar being free and resting, in the closed position of the pan, upon a bar $P^3$, which is pivotally secured between the pan and a strap $d^2$ riveted to the hanger arm D and curved backwardly to receive said bar. The bar $P^3$ is provided with a crank arm $p'$, enlarged at its outer end to secure greater weight and prevent the bar from turning in passing over broken surfaces, and has a diagonally cut-out portion, shown in Fig. 13, which, when the crank arm is raised and the bar turned, permits the locking bar P' to drop down, thus releasing the back of the pan. The crank arm is raised by the hook $m'$ in the same manner as the bar J presently described. Projecting from the side of the bar $P^3$ and opposite the crank arm, is a stud $p''$, which rests against a bolt Q, Fig. 11, and prevents the bar from turning backwardly too far.

A hand lever L is pivotally engaged as at L', with the angular arm D' and the casting F at this side of the machine is provided with an arc $L^2$ provided with notches, and formed concentric with the pivotal connection L'. An operating handle $L^3$ is pivoted upon the free end of the lever L and is provided with the usual connection with a latch $L^4$ arranged to engage with the notches in the arc $L^2$.

Upon the casting F, is provided an angular extension M, to the end $m$ of which is pivoted a bar M' provided upon its free end with a hook $m'$, and a link $m^2$ extends from an angular projection $m^3$ (Fig. 3) on the lever L, to the central part of the bar M', as shown, and for a purpose to be presently described.

I find it convenient to provide the arc $L^2$ with two notches N and N' and at its rear end with a shoulder or stop $N^2$.

The operation of my improved device is as follows:—Assuming that the parts of the machine are in the relative positions shown in Fig. 1 of the drawings, the pan being lowered into its scraping position. In this position, the swinging rear wall C' of the pan, is closed, and the roller $j'$ carried at the forward end of the pivoted arm J, rests in engagement with the flat portion $D^3$ of the hanger D, and thereby serves to lock the rear wall C' of the pan in its closed position during the operation of filling the pan. In this condition, the machine is drawn forward by the team until the pan is filled, when it becomes necessary to elevate the scraper or pan into the position illustrated in Fig. 1, to carry the load to its destination. In order to cause this lifting operation, the driver, by a simple pull upon the cord or chain I, extends the lifting bars H H' in the manner before described, so as to bring them into engagement with the spokes of the wheels. As the said wheels continue to revolve, the bars H H' will be carried from the position shown in Fig. 1, to that shown in Fig. 2, and thus operates to swing the cranked central part of the axle upward and forward, until it reaches the position shown in Fig. 2. This movement brings the points of attachment of the hangers D D to the angular arms D' D', forward of the centers of the wheels A A, and at the same time operates to elevate the pan. As this movement is effected the draft irons are obviously elevated with the pan, the pan tipping slightly backward until stopped by the engagement of the hangers D D with the axle B, and the engagement of the stud $k^3$ with the forward end of the slot $k^2$ in the link K', by which a portion of the load is transferred to the arm $C^2$ upon the back C' of the pan. This strain is communicated by means of the arm J and roller $j'$ to the hanger D, said arm serving to hold the back of the pan in its closed position as before described and the arm $C^2$, serving in connection with the links K K', to sustain the rear end of the pan, so long as the back C' remains thus locked. Now, in order to more securely lock the several parts of the machine in these relative positions, and to prevent any accidental displacement thereof, the driver has only to grasp the lever L and move it so as to permit the latch $L^4$ to engage with the notch N' in the arm $L^2$, and by this movement of the lever L, the link $m^2$ is actuated so as to vibrate the hook bar M' about its pivotal connection $m$ with the arm M, and thereby elevating the free end of said bar so as to bring the hook $m'$ at its said end into engagement with the flat surface $D^3$ of the hanger D, below the point of engagement of the roller $j'$ therewith. As shown in the drawings, the hanger D upon this side of the machine is formed with an extension $d'$ which projects beyond the pivotal point $d$, and is provided at its end with a stud $d^2$ arranged to come into engagement with the hook $H^4$ of the rod $H^3$, so as to actuate said rod to retract the lifting bars H H' in the manner before described to free said bars from their engagement with the spokes of the wheels, this operation being effected at the time when the pan reaches the carrying position shown in Fig. 2. When it is desired to discharge or dump the load, the driver again grasps the lever L, operates the handle $L^3$ so as to release the latch $L^4$ from the notch N', and then pulls said lever backward until the latch comes into engagement with the stop $N^2$. By this movement of the lever, the pivoted bar M' is elevated and its end $m'$ is pressed upwardly against the roller $j'$ and the arm J thereby elevated so as to carry the roller $j'$ above the surface $D^3$ on the hanger D, and thus liberating said roller from its engagement therewith. The driver continues to draw the lever backwardly, the latch $L^4$ bearing against the stop $N^2$, and thus operating to start the cranked axle with the supported pan toward the rear. After this movement has been effected sufficiently to carry the center of gravity back of the centers of the wheels, the axle and connected pan will continue to swing backward and downward by gravity, the arm J with the roller $j'$ projecting forwardly through the space between the side of the pan and the upper end of the hanger D, and as the pan swings backward its forward end will obviously be raised and will carry the draft irons E and the rear end of the tongue E' upward. By this movement of the parts, the back C' of the pan C will be opened by reason of the connection of the arm $C^2$ through the medium of links K K, with the stud $k^3$, and the several parts of the device will now assume the relative positions shown in Fig. 3, the pan being now in a position to permit of the free discharge of the load. Now to return the parts to their second or carrying position, it is only necessary to start the team forward when the pan will swing forward and downward, and assume the position illustrated in Fig. 2, the back C' of the pan returning to its closed position and the arm J sliding backward until its free end is permitted to drop down so as to again bring the roller $j'$ into engagement with the flat portion $D^3$ of the hanger D, the driver, of course returning the lever to its second position so as to bring the latch $L^4$ into engagement with the notch N' in the arc $L^2$. In this condition, the parts are again locked as before described, and the machine is adapted for transportation to the place where it is to be again loaded. Now, in order to lower the pan into position to cause it to again engage with the ground, the driver operates the lever L in a forward direction, disengaging the latch from the notch N' and moving it into engagement with the notch N, thereby depressing the bar M' and moving its hooked end $m'$ out of engagement with the part $D^3$ of the hanger D, and by a slight backward pull upon the lever L starts the cranked axle and the pan backward, so that by the time the center of gravity is moved back of the bearing portions of the axle, the cranked portion of the axle and the pan are free to drop down until the pan comes into engagement with the ground, and the parts assume the positions shown in Fig. 1. As this downward movement of the pan is effected, the arm M on the casting F, is carried forward and the hangers D D with the pan C drop downward, the hanger D and the hook bar M' being thereby moved apart until they assume the relative positions shown in Fig. 1. When the chain and means for locking the back of the pan shown in Figs. 11 and 12 are used, the operation of the device by means of the levers is substantially the same.

As illustrated in the drawings, the ears $e'$ $e'$ with which the draft irons E E are engaged, are secured to the pan slightly above the level of the bottom of the pan, and near the front end thereof, and the weight of the driver and the rear part of the tongue being thus applied to the forward part of the pan, the cutting edge thereof is depressed, and caused to enter the ground with the forward movement of the team.

In order to prevent the pan from entering the ground too deeply, I find it convenient to provide upon the casting F, a downwardly extending arm P provided at its lower end with a stop $p$ arranged in the path of the hanger arm D upon this side of the machine, and to provide a similar stop $p'$ on the end of the arc $L^2$ arranged in the path of the other hanger arm, the arrangement being such, that when the pan enters the ground, and the front end of the pan is depressed below the level of the rear end, the two hanger arms D D will come into engagement with the stops $p$ and $p'$ thus limiting the depth of the cut of the pan. I also prefer to provide upon arm J, a loop J' arranged to engage with the link K so as to support the free end of said arm J when it is projected through the space between the hanger arm and the side of the pan when the machine is operated to discharge the load.

Having described my invention, what I claim as new, and desire to secure by Letters Patent of the United States, is—

1. In a wheeled scraper, the combination with the carrying wheels, a cranked axle and the scraper or pan connected therewith, of transversely extending, longitudinally movable bars arranged to be extended so as to engage with the spokes of the carrying wheels to raise the scraper or pan from the ground, substantially as set forth.

2. In a wheeled scraper, the combination with the carrying wheels, a cranked axle and the scraper or pan having operative connection therewith, of transversely arranged, longitudinally movable lifting bars engaged with the cranked portion of said axle, suitable means under control of the driver for extending said lifting bars into a position to engage with the spokes of the carrying wheels to raise the pan from the ground, and suitable means for automatically retracting said lifting bars when the pan has reached its raised position, substantially as set forth.

3. In a wheeled scraper, the combination with the carrying wheels, a cranked axle and the pan or scraper, of hangers secured to said pan or scraper, castings secured to the cranked part of the axle, pivotal connections between said hangers and said castings, transversely arranged, longitudinally movable lifting bars engaged with suitable bearings in said castings, bell cranks connected with the inner ends of said lifting bars and with each other, a suitable device for simultaneously extending said lifting bars upon opposite sides of the machine so as to bring their outer ends into engagement with the spokes of the carrying wheels, a hooked bar engaged with said bell cranks and adapted to be operated to simultaneously retract said lifting bars and a projection upon one of the hangers adapted to engage with the hooked end of said bar to actuate said bar for the retraction of said lifting bars when the pan has reached its raised position, substantially as set forth.

4. In a wheeled scraper, the combination with the carrying wheels, a cranked axle, the tongue, and a scraper or pan, of hangers secured to the sides of the pan and suspended from the cranked portion of the axle, a hinged back or end to said scraper or pan pivoted to the side thereof by means of a locking bar, the forward end of which rests, in the closed position of the pan, upon a bar having a diagonally cut-out portion and provided at its outer extremity with a crank arm, a chain connecting said hinged back and the tongue, and a lever provided with means for raising said crank arm and turning said bar to permit the free end of said locking bar to drop through said cut-out portion, and release said back, substantially as set forth.

5. In a wheeled scraper, the combination with the carrying wheels, a cranked axle, and the pan or scraper, of castings secured to the cranked part of said axle and provided with projecting arms, hangers upon opposite sides of the pan having pivotal engagement with the extremities of said projecting arms, lifting bars movably engaged with said castings and adapted to be simultaneously extended into engagement with the spokes of the wheels upon opposite sides of the machine to lift the pan or scraper from the ground, a latch bar pivotally engaged with one of said castings and adapted to be moved into engagement with one of the hangers to lock the hangers and the axle together, a pivoted back to the pan linked to the tongue, a locking device for normally securing said back in a closed position and means for freeing said pivoted back so as to permit the rear end of the pan to descend to dump the load, substantially as set forth.

6. In a wheeled scraper, the combination with the carrying wheels, a cranked axle and a pan or scraper suspended from said axle by suitable hangers of suitable means for raising the pan from the ground, a latch for locking the hangers to the axle when said pan is raised, a hinged back to the pan, means for normally locking said back in a closed position a link connection between said hinged back and the tongue, and a lever operatively connected with said latch and adapted to be operated at times to free the hinged back of the pan and at times to actuate said latch to free the hangers from engagement with the axle, substantially as set forth.

In testimony whereof I affix my signature in presence of two witnesses.

FRANK A. RATHBUN.

Witnesses:
H. C. GARDINER,
L. S. PEARSON.